(12) United States Patent
Markley

(10) Patent No.: US 6,990,972 B2
(45) Date of Patent: Jan. 31, 2006

(54) GUIDE FOR CONCRETE CUTTING BLADE

(75) Inventor: Charles E. Markley, Anaheim Hills, CA (US)

(73) Assignee: Soff-Cut International, Inc., Corona, CA (US)

( * ) Notice: Subject to any disclaimer, the term of this patent is extended or adjusted under 35 U.S.C. 154(b) by 115 days.

(21) Appl. No.: 10/777,874

(22) Filed: Feb. 11, 2004

(65) Prior Publication Data

US 2005/0172946 A1 Aug. 11, 2005

(51) Int. Cl.
*B24D 1/04* (2006.01)
(52) U.S. Cl. .............................. 125/13.01; 125/13.03; 125/14; 83/33; 83/102.1
(58) Field of Classification Search ............ 125/13.01, 125/13.03, 14, 15; 451/352, 358; 83/33, 83/863, 864, 102.1
See application file for complete search history.

(56) References Cited

U.S. PATENT DOCUMENTS

| | | | |
|---|---|---|---|
| 1,356,339 A | 10/1920 | Clarke | |
| 1,726,665 A | 9/1929 | Heltzel | |
| 1,778,451 A | 10/1930 | Edge | |
| 1,916,887 A | 7/1933 | McClain | |
| 1,921,185 A | 8/1933 | Heltzel | |
| 1,966,489 A | 7/1934 | Edge | |
| 1,997,216 A | 4/1935 | Heltzel | |
| 2,673,725 A | 3/1954 | Coates | |
| 2,949,068 A | 8/1960 | Gresham | |
| 3,464,737 A | 9/1969 | Haase et al. | |
| 5,579,753 A * | 12/1996 | Chiuminatta et al. | 125/12 |
| 5,709,200 A * | 1/1998 | Mertes | 125/13.01 |
| 6,112,736 A * | 9/2000 | Bearden | 125/13.01 |
| 6,463,836 B1 * | 10/2002 | Snodgrass, Jr. | 83/13 |

* cited by examiner

*Primary Examiner*—Eileen P. Morgan
(74) *Attorney, Agent, or Firm*—Stetina Brunda Garred & Brucker

(57) ABSTRACT

A concrete saw has a rotating cutting blade that rotates in a first plane to cut a groove in a concrete surface. The blade is guided along that groove by two guides. A rolling or sliding support member on opposing sides of each guide roll or side along the concrete to support the saw blade on the concrete and to position the blade relative to the concrete. The guides and rollers are advantageously on opposing sides of the blade. The guide can be a sliding member but is preferably a rolling disc sandwiched between two rolling supports. A diverter can prevent debris from the blade from getting under the movable support.

39 Claims, 9 Drawing Sheets

GUIDE FOR CONCRETE CUTTING BLADE

BACKGROUND OF THE INVENTION

This invention involves an improved method and apparatus for maintaining a cutting blade aligned with a previously cut groove and is typically used to more uniformly and precisely shape the edges of grooves previously cut in concrete surfaces.

Concrete surfaces are commonly used for roads, driveways, sidewalks, flooring and to form other flat surfaces. As the concrete cures a chemical reaction occurs and the concrete shrinks and cracks. Grooves are cut in the concrete to form weakened planes and to cause the cracks to form along the grooves rather than randomly cracking. These crack control grooves were typically cut the day after the concrete was poured and finished, and cut from ¼ to ⅓ the thickness of the concrete slab being cut. More recently the grooves are often cut shortly after the concrete surface is finished using processes and equipment described in patents to Chiuminatta, et al., and the depth of the groove is less than ¼ the thickness of the concrete being cut, and sometimes as shallow as half an inch. In addition to these crack control grooves, grooves are sometimes cut or formed for decorative purposes. The depth of these decorative cut grooves will vary.

But whether cut early or the next-day after finishing, these cut grooves have a sharp corner on each edge of the groove. These sharp corners tend to break over time and that is not attractive. For aesthetic and structural reasons, there are advantages to rounding or altering the otherwise sharp corners on these grooves which are cut in the concrete surface. This is currently done by grinding or cutting the corners to the desired shape with a blade at least partially coated with abrasives and which is configured to form the desired shape on the edges of the groove. The more common shapes for the exterior edges of the groove are V-shaped notches which put a flat bevel on opposing edges of the groove, or rounded edges on the groove.

Unfortunately, as the abrasive blade cuts or forms the corners of the groove, the blade moves up and down as the concrete surface varies or as the operator moves the saw driving the blade. Further, the abrasive blade is guided along the pre-cut groove by the operator, and that results in the blade weaving back and forth along the groove. The weaving occurs even though a guide may be placed on the saw which follows or extends into the groove in the front of the abrasive blade. Each movement of the blade relative to the concrete surface or away from the centerline of the pre-cut groove causes the shaped edges to vary and that is undesirable. There is thus a need for a better way to cut or form the edges of these pre-cut grooves in a more consistent manner.

SUMMARY OF THE INVENTION

The edges of the groove are cut by a rotating abrasive blade placed between two guides each of which has a portion of the guide placed inside the pre-cut groove and extending into the groove a distance which is about the same as and preferably greater than the depth of the shaped contour being formed on the edge or edges of the groove. Advantageously, but optionally, these guides take the form of rotating disks extending into a pre-cut groove a distance less than the depth of the groove but greater than the depth of the formed portion of the groove edges. Preferably, but optionally, each guide has a rotating shoulder or flange resting on the exterior concrete surface adjacent the groove. Advantageously the guide is located between two shoulders so the guide is supported on both sides of the pre-cut groove. By placing the shoulders and guide close to the cutting blade, the shoulders can control the depth of cut more accurately and center the blade more accurately. When placed close to the cutting blade, a diverter may be interposed between at least the edge of the blade exiting from the concrete in order to divert debris from the cut from getting between the shoulder supports and the concrete and causing the depth of cut to vary or from obstructing the adjacent guide and causing it and the blade to waver from a constant line along the cut groove.

These shoulders are advantageously positionable so the location of at least one shoulder can be varied relative to the rotational axis of the cutting blade in order to adjust location of that rotational axis relative to the groove being cut. That has the effect of varying the depth of cut of the rotating abrasive blade, and that varies the shape of the contour being cut or formed on the edge or edges of the groove.

While the guide is preferably rotating, it could be a sliding projection extending from a skid plate in to the cut groove. While two guides are preferably used, a single guide could be used if it is of sufficient length within the groove to center the cutting blade and keep it aligned with the groove. Advantageously though two guides are used, and they are on opposing sides of the cutting blade.

The two guides are advantageously as close together as practical, as a shorter distance between the two guides allows the guides to better track shorter radius curves in the path of the pre-cut groove. The shorter distance between the two guides also allows the two guides to more easily follow any variations in the concrete surface and that is believed to result in less variation in the formed edges caused by the rotating cutting blade moving toward and away from the concrete surface.

In one embodiment the concrete saw is used with a rotating cutting blade that rotates in a first plane to cut a groove in a concrete surface. The saw has a first guide sized to fit in the groove and located in front of the cutting blade and positionable in the first plane. The first guide extends a distance sufficient to extend beyond the surface of the concrete cut by the saw during use of the saw. The saw has a second guide sized to fit in the groove and located behind the cutting blade and positionable in the first plane. The first guide extends a distance sufficient to extend beyond the surface of the concrete cut by the saw during use of the saw.

In further variations of this first embodiment, one of the guides takes the form of a pilot on the blade. At least one guide could include a sliding plate with the guide depending from the plate, or the guide could comprise a rotating disk. The pilot or rotating disk advantageously, but optionally has a distal edge with the disk or pilot tapered toward that distal edge. The disk or pilot advantageously has a diameter selected so that while it extends beyond the surface of the concrete it does not extend a distance sufficient to contact a bottom of a groove previously cut in the concrete surface. Further, there are advantageously, at least one guide comprises a rotating disk having a rolling support on at least one side of the disk with the rolling support sized so it contacts the concrete surface during use of the saw to cut the concrete. Moreover, at least one guide advantageously comprises a rotating disk having a rolling support on opposing sides of the disk. In the preferred orientation, at least one of the guides rotates about an axis substantially perpendicular to the concrete surface during cutting, and also preferably, but optionally also rotates about an axis substantially perpendicular to the concrete surface during cutting. Moreover, the blade advantageously rotates in an up-cut rotation and exits the concrete adjacent the first guide, and preferably a diverter is interposed between the blade and first guide to shield the first guide from debris from the blade.

In further variations on this first embodiment, a spring resiliently urges at least one of the supports toward the concrete surface during use of the saw. Advantageously, spring resiliently urges the support adjacent the second guide toward the concrete surface during use of the saw, and the support adjacent the first guide is mounted to a shaft confined to move toward and away from the concrete along an axis substantially perpendicular to the concrete, with a stop located to limit the movement of that support during use of the saw.

A second embodiment includes a concrete cutting saw for use with a rotating cutting blade that rotates in a first plane, with the cutting blade being mounted to a pivoting frame which is mounted to and pivots relative to a wheeled carriage frame. The cutting blade is configured to form the edges of a groove previously cut in a concrete surface to a first depth of the groove. The groove also has a second depth. The saw of this second embodiment includes first guide means for guiding the cutting blade along the groove. The first guide means extends into the groove a distance less than the second depth. The saw also optionally, but advantageously has a second guide means for guiding the cutting blade along the groove. The second guide means extend into the groove a distance less than the second depth.

In variations of this second embodiment, at least one of the first and second guide means rotates about an axis parallel to the concrete surface during cutting. A further variation includes first movable support means for supporting the first guide means on the concrete surface during cutting.

A third embodiment comprises a concrete saw for shaping one or more exterior edges of a groove in a concrete surface to a first depth, where the groove is cut in the concrete to a second depth which is greater than the first depth. The saw of this third embodiment comprises a rotating cutting blade having at least one cutting surface configured to shape at least one of the edges during use of the saw. A first movable support is connected to the saw and located to abut the concrete surface adjacent the groove and sufficiently close to the cutting blade that debris from the shaping of the at least one edge would be thrown by the blade so as to get between the movable support and the concrete. A first guide is connected to the saw and extends into the groove adjacent the first support a distance less than the second depth. The first guide is in the same plane as the cutting blade during use of the saw. A first diverter is connected to the saw and located so the diverter is interposed between the cutting blade and the first movable support member. The first diverter is large enough and located close enough to the concrete to block debris from the blade from getting between the first movable support and the concrete.

In further variations of this third embodiment the blade is an up-cutting blade and the first guide and first diverter are located on the leading end of the saw. In other variations, a second guide is connected to the saw and extends into the groove during use of the saw. A second movable support member is preferably, but optionally, located adjacent the second guide and abuts the concrete surface adjacent the groove during use of the saw. In other variations, the second guide is on the opposing side of the blade as the first guide during cutting, or on the same side of the blade as the first guide during cutting, or both the first and second guides are on the leading side of the blade during cutting.

In further variations, a movable support member is located adjacent the second guide and abuts the concrete surface adjacent the groove during use of the saw. The first guide advantageously, but optionally takes the form of a rotating disc. Advantageously the first guide is located on the leading side of the cutting blade, with the first guide and the rotating cutting blade being connected to a common frame, and the first movable support is mounted to the frame and adjustably positionable relative to the frame in order to vary the distance between the frame and the concrete surface.

The present invention also includes a method of shaping one or more exterior edges of a groove cut in a concrete surface using a saw with a rotating cutting blade having a contour selected to provide a desired shape on at least one exterior edge. The method includes placing a first guide in the groove, the first guide being connected to the saw and placing a second guide in the groove. The second guide is connected to the saw, and the first and second guides align the rotating blade with the groove. The method includes using the first and second guides in the slot to guide the saw along the groove, and rotating the cutting blade to shape the one or more exterior edges as the saw is guided along the groove.

In further variations, the method also includes placing the first and second guides on opposing sides of the cutting blade during shaping of the one or more edges of the groove. Alternatively, the method includes placing the first and second guides on the same side of the cutting blade during shaping of the one or more edges of the groove. Preferably, the method includes supporting the saw on the concrete adjacent to the first guide. The supporting step advantageously, but optionally, uses at least one moving support. Preferably, but optionally, the supporting step uses two rolling surfaces, one on each side of the first guide.

A further variation on the method includes diverting debris from the cutting blade adjacent the location where the cutting blade exits the groove so as to prevent the debris from passing between concrete and the moving support. The method also advantageously rotates at least one guide about an axis perpendicular to the concrete surface in which the groove is located. Finally, the method can optionally include adjusting the depth of cut of the cutting blade by adjusting the position of the movable support relative to the saw.

DRAWINGS

These and other features and advantages of the invention will be better understood with respect to the following description and drawings, in which like numbers refer to like parts throughout, and in which.

DETAILED DESCRIPTION OF THE INVENTION

Figure 1:
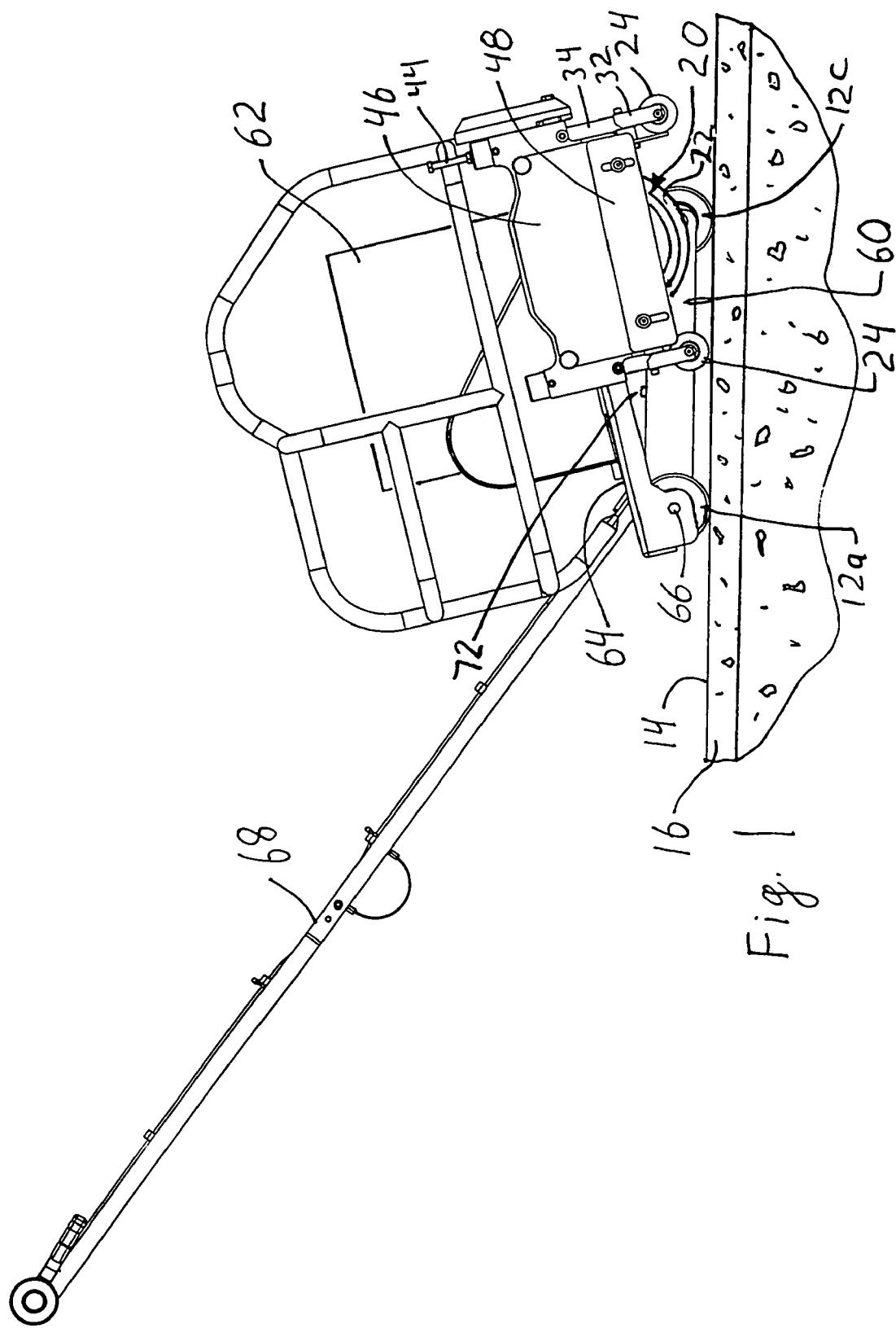
FIG. 1 is a side view of a saw of this invention.

Referring to FIGS. 1, 2, 4 and 8, a saw 10 has wheels 12 rollably supporting the saw on a concrete surface 14 in which a pre-formed groove 16 was previously made, either cut by a rotating blade or by a trowel or other groove-forming mechanism. The groove 16 is advantageously, but optionally, formed by a rotating cutting blade which leaves the groove with generally parallel side walls having exterior and interior corners. A groove 16 formed by any of these various methods is referred to herein as a pre-cut or cut groove, unless one of the specific methods of forming the groove is more explicitly stated.

The pre-cut groove 16 has opposing exterior corners or edges 18a, 18b which are shaped by a rotating blade 20 on the saw 10 to a desired configuration. The rotating blade 20 has a cross-sectional profile selected to form a desired contour or shape on the edges 18 of the groove 16. The various configurations of the blade 20 that produce the desired shapes on the edges 18 are known, are of a great variety, and are not described in detail herein.

Figure 8:
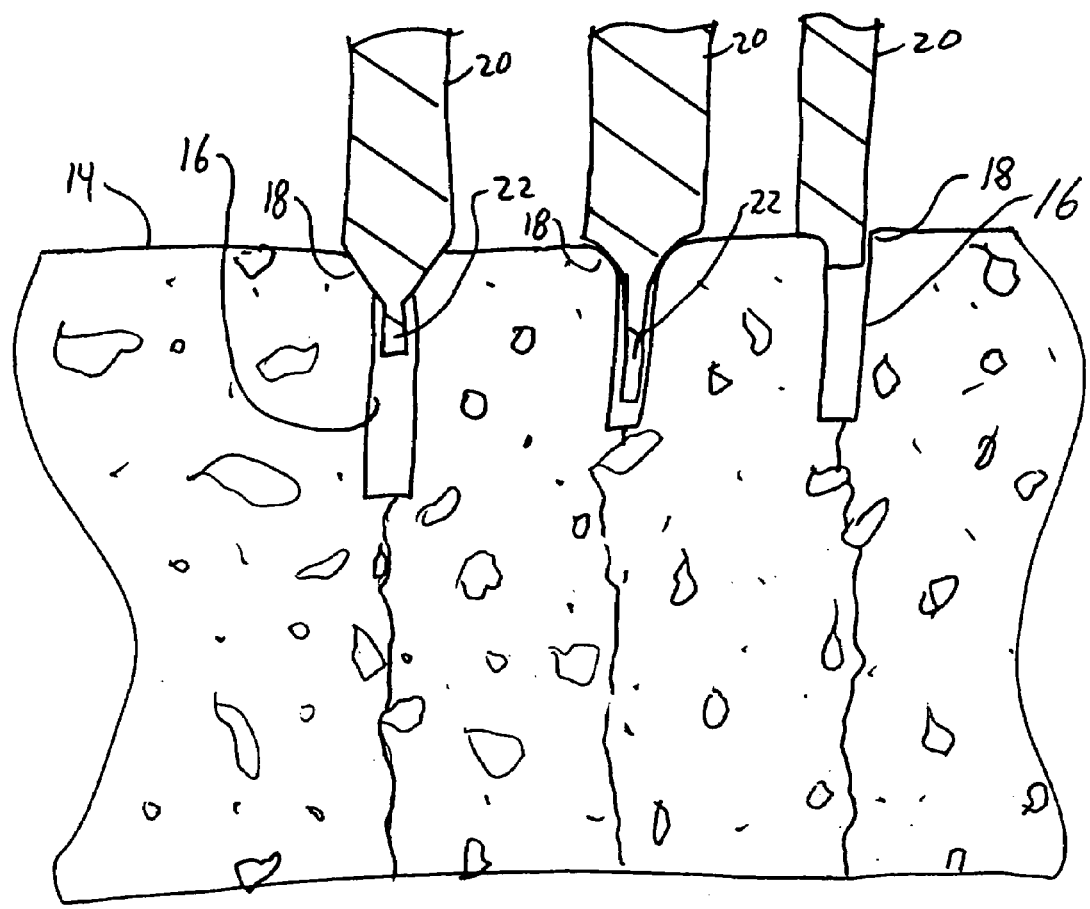
FIG. 8 is a sectional view of concrete grooves showing variously shaped blades located to shape the edges of the groove in the concrete with different contours.

But referring to FIG. 8, illustrative cross-sections of the cutting blade 20 and contoured edges 18 are shown. The cutting blades 20 may be dry cut blades, or they may be wet cut blades in which case a source of water or other suitable lubrication may be provided independently, or may be fastened to the saw 10. The cutting of the exterior edges 18 advantageously occurs the next day after the concrete is finished, with the groove 16 being cut using early entry technology which cuts shortly after finishing, or with the groove 16 being cut the day after finishing.

The blade 20 is shown with a pilot 22 that extends into the groove 16 to help the blade align with the groove, but the pilot may be omitted. If a pilot 22 is used, the sides of the pilot advantageously do not have abrasives thereon so as to cut the sides of the groove 16. The thickness of the pilot along the axis of rotation of the blade 20 is advantageously slightly less than the width of the cut groove 16, but not so close as to cause the blade to bind. A spacing between the pilot 22 and the adjacent wall of the cut groove 16 of about 0.05 to 0.1 inches is believed suitable.

Referring to FIGS. 1–7, at least one, and preferably two guides 24 are placed in the groove 16 to guide the blade 20 along the groove 16, and to align the blade with the groove. The guides 24 each advantageously comprise circular discs having a thickness smaller than the width of the groove 16 so the walls of the groove 16 help the guides 24 follow the cut groove 16. A spacing between the sides of the disc and the adjacent walls of the groove 16 of about 0.05 to 0.1 inches are believed suitable. Preferably the spacing is less than about 1/16 inch, but smaller than the width of the groove 16.

Each disk-shaped guide advantageously, but optionally, has opposing side-walls tapered inward toward the distal periphery at an angle of about 5–15 degrees, and preferably at an angle of about 10 degrees. The taper helps center the guide 24 in the groove 16 while reducing excessive contact with the sides of the groove that may risk damaging those sides. The construction and mounting of each guide 24 is similar, so only one is described in detail. If a tapered disk is used for the guide 24 then the distal end of the disk can be spaced further from the wall than the 0.05 to 0.1 inch spacing discussed above. The sides of the guide 24 are advantageously non-abrasive so they do not remove material from the walls forming the groove 16 but merely abut those walls to guide the blade along the groove.

The rotating cutting blade 20 is advantageously located between the two guides 24 so the blade is kept aligned with the groove 16 by the guides 24. The distal periphery of the guide 24 advantageously does not contact the bottom of the groove 16 cut in the concrete as that could cause vertical movement of the guide and portions of the saw 10 connected to the guide. To limit the depth which the guide extends into the groove 16, a movable support 26 is advantageously placed adjacent at least one side, and preferably on opposing sides of each guide 24. The movable support 26 can slide or roll. If it slides, the sliding portion in contact with the concrete 14 is advantageously sized so it does not mark the concrete surface during use.

The movable support 26 advantageously takes the form of a roller which rolls on the concrete surface 14. By placing an axle 28 through the center of the rolling support 26 and through the center of the disk-shaped guide 24, the depth to which the guide extends in to the groove 16 can be controlled. The rolling contact allowed by the rolling support 26 also allows easy movement of the support 26. A rolling support 26 with a diameter of about 3/4 to 1.5 inches along with a guide of about 1.5 to 2.5 inches in diameter are believed suitable, but larger or smaller diameters could be used on either part according to the particular circumstances and design. In the illustrated embodiment, the difference in diameters between the shoulder(s) and the adjacent guide 24 defines the depth to which the guide extends into the groove 16, and that depth or distance should be less than the depth of the groove 16, and preferably, but optionally, about the same as or greater than the depth to which the exterior edge(s) 18 are formed by the cutting blade 20.

The guide 24 and support 26 can be separate parts which rotate together or independently, with the support(s) 26 in contact with the concrete as the saw 10 moves along the groove 16, with the supports 26 on each side of the groove. The guide 24 inside the groove guides the blade 20 along the groove. Alternatively, the guide and support or supports could be made out of a single piece of metal, or the central disk 24 could be sandwiched between two separate rolling supports 26. Metal or plastic is believed suitable material for the support(s) 26 and guide 24. Preferably, a single piece, steel construction is used, with a cylindrical hole through the length of the parts so a bushing or bearing 30 can be inserted between the axle 28 and the interior of the rollers 26 and guide 24. If made as a single part, then rotation of the rolling support(s) 26 also rotates guide 24 and that makes it easier to move the saw and to guide the blade along the groove 16. While the guide 24 advantageously rotates, it need not do so, and could be a non-rotating projection fitting into the groove 16.

As used here, front or leading refers to the direction of travel, while back or trailing refers to a direction away from the direction of travel. As used herein, up means away from the concrete surface and down means toward the concrete surface. Preferably the guide 24 at the front or leading end of the saw 10 extends into the groove 16 a distance about the same as or greater than the depth to which the exterior edges 18 are shaped or formed by the blade 20. The guide 24 at the rear or trailing end of the saw 10 preferably extends the same distance into the groove 16, but could extend less. Further, the guide 24 at the trailing end of the saw 10 could be configured with the same contour as is being cut on the edges 18 by the rotating blade 20 in order to position the blade 20 in the groove 16.

In addition to preferably rotating about an axis generally parallel to the concrete surface 14, the guide 24 also preferably, but optionally, rotates about an axis generally perpendicular to the concrete surface and is resiliently movable along that generally perpendicular axis. This can be achieved various ways, but in the illustrated embodiment it is achieved by holding opposing ends of the axle 28 in a yoke 32 that is mounted to a shaft 34 which in turn is mounted in a guide block 36 so as to allow rotation of the shaft 34 and yoke 32 about the longitudinal axis of the shaft 34. Rotation about an axis perpendicular to the concrete surface 14 allows the guide 24 to follow a curved groove 16 with less risk of binding and attendant interruption of the movement of the saw 10 along the groove 16. A bearing or bushing 35 can be used to make this rotation easier, with a pin or fastener 37 extending through guide block 36 to prevent the bushing 35 from slipping out of the guide block. A similar pin or fastener could be used to fix the cap 40 to the block 36 rather than using a threaded connection.

Figure 4:
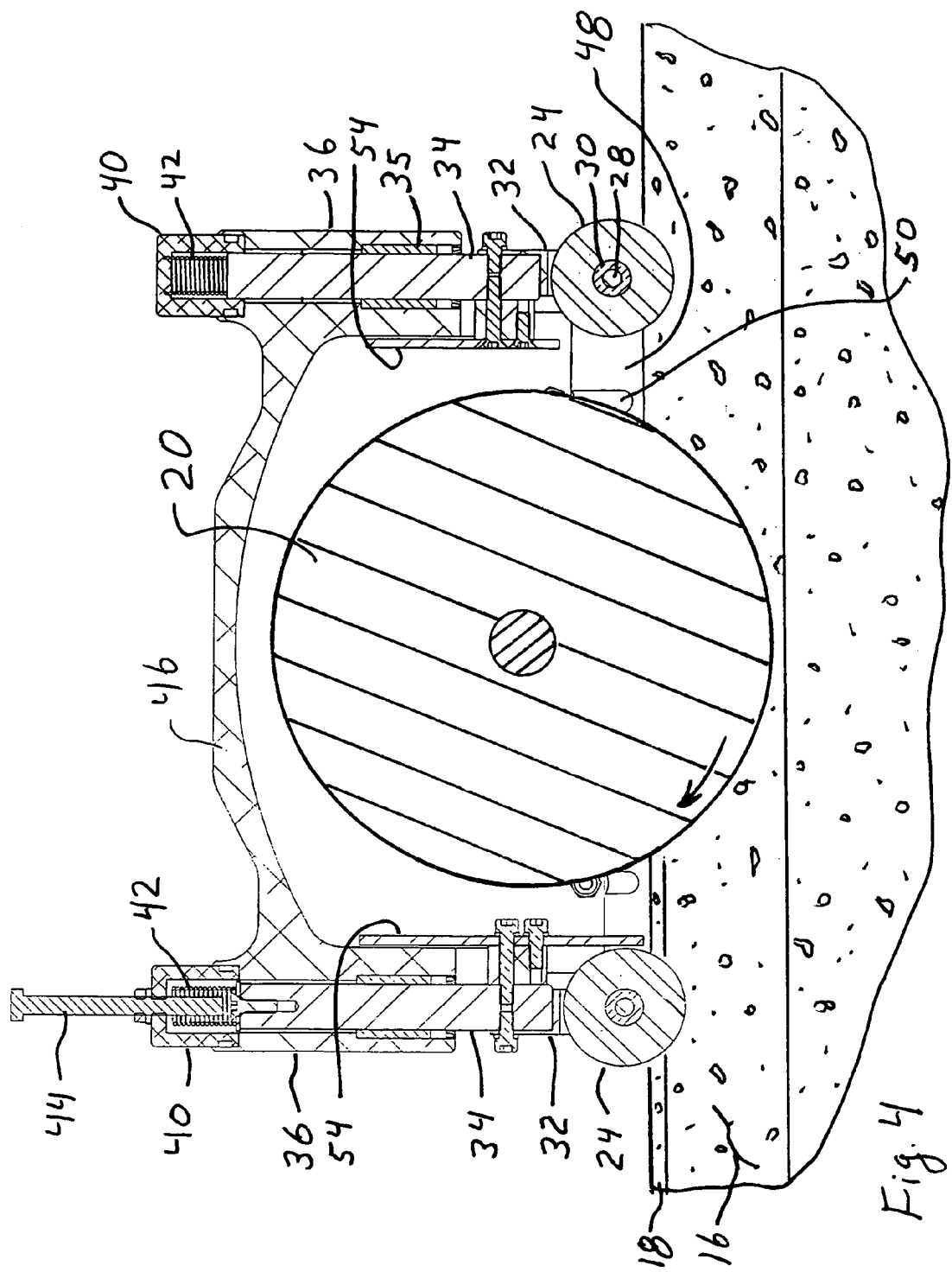
FIG. 4 is sectional view of a blade housing and blade guide assembly used on the saw of FIG. 1 during cutting
Figure 5:
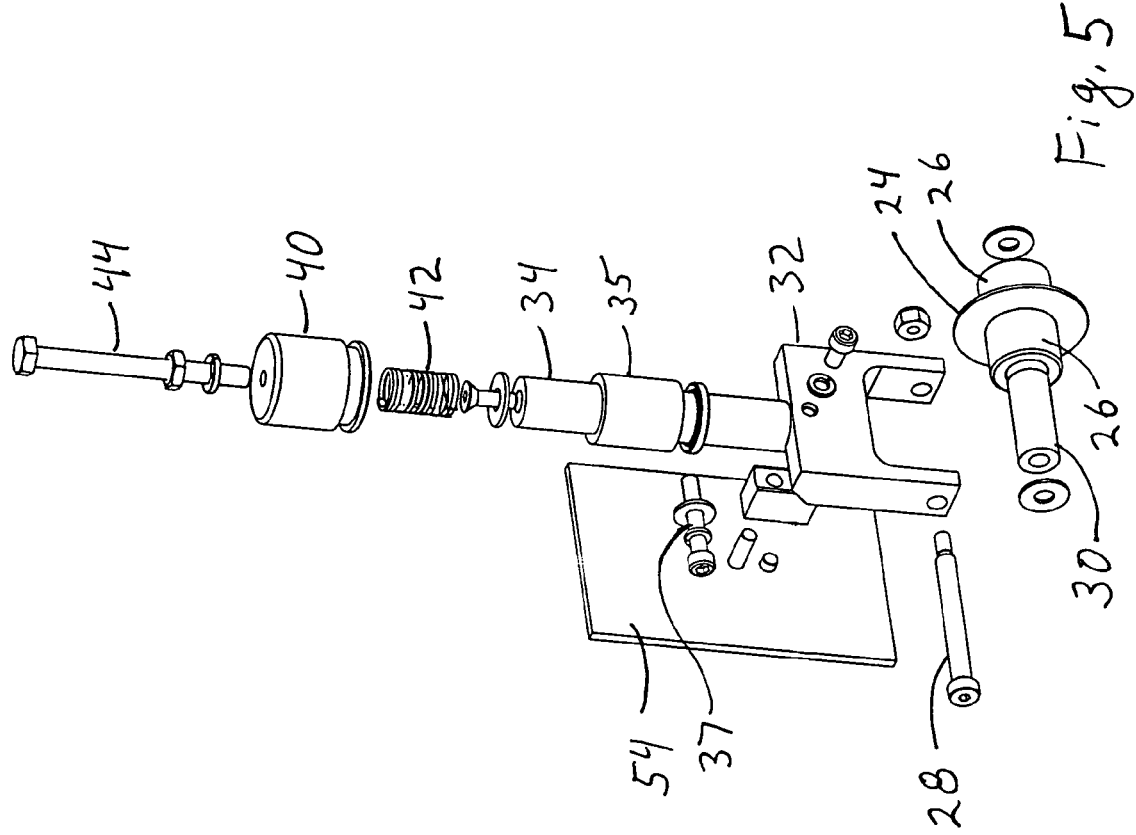
FIG. 5 is an exploded perspective view of portions of a blade guide assembly.
Figure 6:
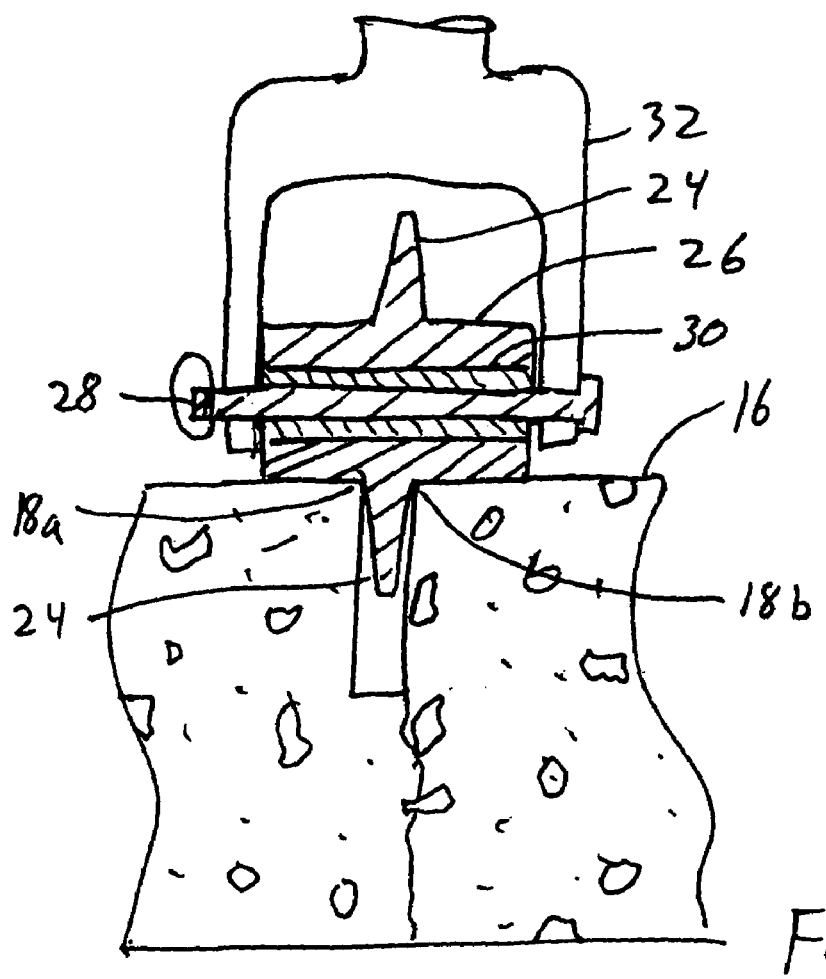
FIG. 6 is a sectional view of a concrete groove and a portion of an embodiment of the blade guide assembly of FIG. 1.
Figure 7:
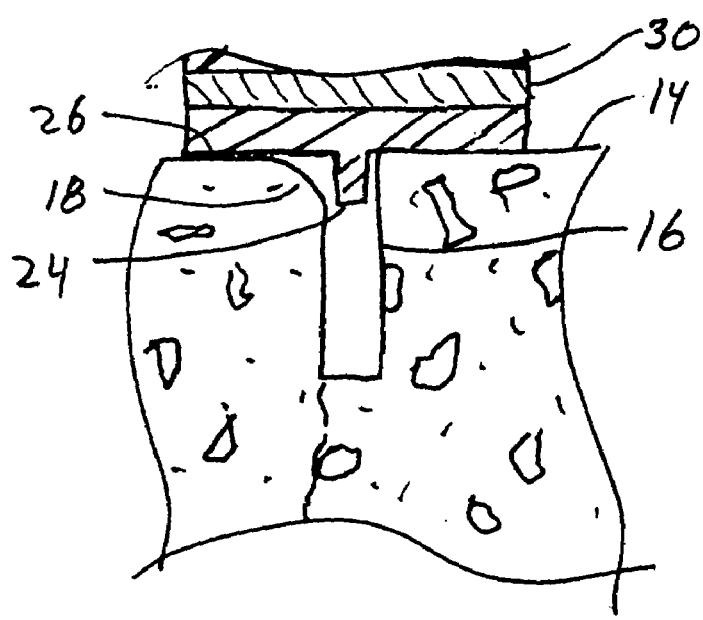
FIG. 7 is a sectional view of a concrete groove and a portion of a further embodiment of the blade guide assembly of FIG. 1.

Referring to FIGS. 4–5, the shaft 34 has a protrusion against which a spring is placed to resilient urge the shaft 34 toward the concrete 14. This protrusion can take various forms, including a pin, but preferably it takes the form of a stepped diameter forming a shoulder 38. The shaft 34 fits in a generally cylindrical cavity formed in the guide block 36. One end of the cavity is blocked so the shaft cannot pass through the cavity. In the illustrated embodiment a cap or plug 40 blocks one end of the cavity. A compression spring 42 fits over the shaft 36, with one end of the spring 42 abutting the shoulder 38 and the other end abutting the plug 40. The spring 42 resiliently urges the shaft 34 and guide 24 away from the guide block 36 and toward the concrete surface 14.

Advantageously, but optionally, the spring 42 and shaft 34 allow several inches of movement by the guide 24 in order to make it easier to initially position the guides in the groove 16. In one embodiment the vertical position of the front or leading guide 24 relative to the concrete is advantageously limited and fixed, while the vertical position of the trailing guide is allowed to float. But either guide could be floating, or fixed, or both could be floating or fixed. Preferably the travel of the leading guide 24 is adjustably limited by placing a threaded member, such as a screw 44 through a threaded opening in the plug 40 until the end of the screw sets the desired limit of motion. When the distal end of shaft 34 hits the screw 44 the movement of the shaft is stopped. Because the shaft is structurally connected to the axis 30 about which the rolling supports 26 and guide 24 rotate, the position of the guide 24 is also limited by movement of the shaft 34. By adjusting the length of the screw 44, the relative position of the guide block 36 in which the shaft 34 is mounted, and the support rollers 26 and guide 24, can be changed.

A similar result could be achieved by extending a projection from the plug 40 and positioning the plug 40 relative to the housing in which it is fastened to adjust the position of the distal end of the plug relative to the shaft 34.

The leading and trailing guide blocks 36 are fastened to opposing ends of a blade housing 46. The drive shaft which rotates the cutting blade 20 extends through the blade housing and is fixed in position relative to that blade housing. Thus, lengthening the screw 44 in the leading guide block 44 tilts the front of the blade housing 46 upward, away from the concrete surface 14 and moves the blade 20 away from the concrete. Shortening the screw 44 in the leading guide block 44 tilts the front of the blade housing 46 downward, toward the concrete surface 14 and moves the blade 20 toward the concrete. As the blade 20 moves toward the concrete 14, it cuts deeper into the concrete. As the blade 20 moves away from the concrete 14, it cuts less into the concrete. The adjustment of the screw 44 thus adjusts the depth of cut on the blade 44 by varying the distance between the guide block 36 and the rolling support 26 which rolls on the concrete surface 14.

The trailing guide block 36 and its associated guide 24 and support(s) 26 could also be adjusted to have a desired location relative to the concrete surface 14. Advantageously though, the trailing guide block 36 has no motion limiting device such as the screw 44. Rather, it houses a spring 42 which resiliently urges the rear shaft 34 and associated rear guide 24 and rear support(s) 26 toward the concrete, but which accommodates movement toward and away from the concrete 14. The blade housing 46 thus has a front guide block 36 on the front end, and a rear guide block 36 on the rear end. The front guide block 36 and associated shaft 34 and roller support(s) are used to set the depth of cut, while the rear guide block 36 and its associated roller support(s) are allowed to float.

In use, the shaft 34 connected to the front or leading guide 24 and front support(s) 26 hit the position stop formed by the screw 44 which is used to set the depth of cut by the blade 20. The weight of the saw 10 is distributed so enough weight is exerted on the front support rollers 26 to cause the leading shaft 34 to hit the position stop formed by screw 44. The trailing guide block 36 has no movement limiting stop so the trailing shaft 34 floats because the trailing spring 42 allows relative movement between the concrete surface 14 and the trailing guide block 36 and the trailing shaft 34 mounted in that trailing guide block. This movement relative to the blade housing 46 and trailing guide block 36 allows the trailing roller supports 26 to roll over debris from the cutting blade while not affecting the depth of cut. If the front roller support(s) 26 roll over debris, that forces the front roller support(s) up and against the screw 44, which causes the front guide block 36 and the front end of the blade housing 46 to rise. As the blade 20 moves with the blade housing 46 the blade will rise out of the concrete and vary the shape of the edges 18 being cut by the blade.

As seen in FIGS. 1–4, the cutting blade 20 is enclosed within the blade housing 46. Freely sliding side shields 48 allow movement toward and away from the concrete to accommodate movement of the blade 20 and blade housing 46 relative to the concrete surface 14. Posts 52 extending from the blade housing 46 extend through slots 50 in the side shields 48 to allow the shields to be fastened to the blade housing but still move along the slots to allow movement of the shields relative to the housing. In use the side shields 48 slides along the concrete surface 14 and enclose the cutting blade 20 on opposing sides of the blade, parallel to the blade. The side shields 48 contain the debris from the cutting blade.

Front and rear diverters 54 enclose the blade 20 at the front and rear. The diverters can take various forms, but in the illustrated embodiment they comprise generally rectangular sheets of metal or plastic that extend into the guide block 36 a distance sufficient that debris from the rotating cutting blade do not pass over the top of the diverter where the debris can fall onto the concrete surface 14. Each diverter 54 is fastened to the adjacent shaft 34 or yoke 32, but preferably offset therefrom to place the diverter closer to the blade 20.

The diverter 54 extends into the guide block 36 or into the blade housing 46 that it is adjacent to, but it is slightly spaced from the wall of the guide block or housing enclosing the diverter. The space between the diverter 54 and the closest portion of the guide block or blade housing acts to define the permissible rotation of the shaft 34 and thus the guide roller 24 connected to that shaft. As the guide roller 24 rotates about an axis perpendicular to the concrete surface 14, the shaft 34 rotates, causing the diverter 54 to rotate. When the diverter 54 hits the closest part of the guide block 36 or blade housing in which it is enclosed, the rotation will stop.

This rotation limit on shaft 34 limits the curvature of the groove 16 which may be followed by guides 24 which are connected to the shaft. The rotation limit also helps keep the guides 24 in generally the same plane and makes it easier to align them with the groove 16 and to insert them into the groove 16. A rotation of about 5–15 degrees is believed suitable for the shaft 34, but larger rotations could be used. A smaller amount of rotation of shaft 34 and guide 24 is permitted, but it limits the use of the saw in following grooves 16 that are not straight.

The shaft 34 could be fixed and not rotating, and that is believed to also work to guide the blade 20, but is not as desirable as any curvature in the groove 16 may cause the guides 24 to damage the exterior edges 18 of the groove in a way that may be visible after cutting by the blade 20. Further, if two spaced apart guide members 24 abut the walls of the groove 16, they could abut the walls and bind movement of the saw along a curved groove 16 unless the guide members 24 are allowed to rotate about the vertical axis, or the axis perpendicular to the concrete. The amount of potential binding is reduced if the guides 24 are closer together, but allowing the guides 24 to rotate about the axis perpendicular to the concrete reduces this binding by allowing the guides to track a curved groove 16.

The leading diverter 54 is advantageously offset from the shaft 34 a distance sufficient that it clears the guide 24 and has a bottom edge adjacent the concrete 14. The bottom edge of the diverter 54 is preferably at about the same location as the bottom of the adjacent support rollers 26 during cutting. The bottom edge of the leading diverter 54 should be spaced slightly apart from the concrete surface rather than scrape it. But it is desirable to have the bottom edge of the leading diverter 54 close to the concrete so that debris from the up-cutting blade 20 is not thrown under the support rollers 26 as that could cause the rollers to rise and fall, with resulting variations in the depth of cut made by the blade 20. A spacing of about 1/8 of an inch is believed suitable.

The diverter 54 on the trailing end of the saw 10 need not extend to the concrete, and advantageously forms a gap between the concrete and the trailing diverter through which debris from the cutting blade is expelled. The rear roller support(s) 26 rides over the debris, with the spring 42 on the shaft 34 accommodating the motion while reducing the effect on the depth of cut formed by the blade 20.

The leading diverter 54 is advantageously located as close to the guide 24 as possible without interfering with the movement of the diverter or guide. The shorter distance allows a more accurate control of the depth of cut by the blade 20 when the leading support(s) 26 are used to adjust the position of the cutting blade 20. But placing the leading guide 24 close to the up cutting edge of the blade 20 causes debris from the blade to be thrown onto the support member(s) 26, and those debris can cause the support member 26 and guide 24 to move away from and toward the concrete or to move sideways relative to the length of groove 16. The up and down movement can cause the depth of cut by blade 20 to undesirably alter the shape of the exterior corners 18. The side to side movement can cause the formed corners to wave and deviate locally from the path of the groove 16. Thus, the diverter 54 must be located and sized to prevent debris from the cutting blade from getting to the moving support 26.

If the blade rotates in a down-cut rotation, then the possibility of debris being thrown onto the front support(s) 26 is less, and the leading diverter need not be as close to the concrete, and in some instances could be omitted. If the front support member is free to float so movement toward and away from the concrete 14 does not alter the edges 18 cut by the blade 20, then the amount of debris ejected onto the front support(s) 26 is less important and the diverter can be further from the concrete, or omitted.

If the rear guide 24 and rear support 26 are used to set the depth of cut by blade 20, then a diverter 54 should be used to prevent debris from causing the rear support 26 and rear guide 24 from moving sufficiently to cause a noticeable variation in the formed edges 18 caused by rotating cutting blade 20.

For a 5 inch diameter cutting blade 20, the front roller support 26 is advantageously about 4–6 inches away from the rotational axis of the blade 20. The front roller support 26 preferably comprises rollers about 1.5–2 inches in diameter and the guide is about 3–4 inches in diameter, so there is relatively little clearance space between these parts when they are circular.

Figure 2:
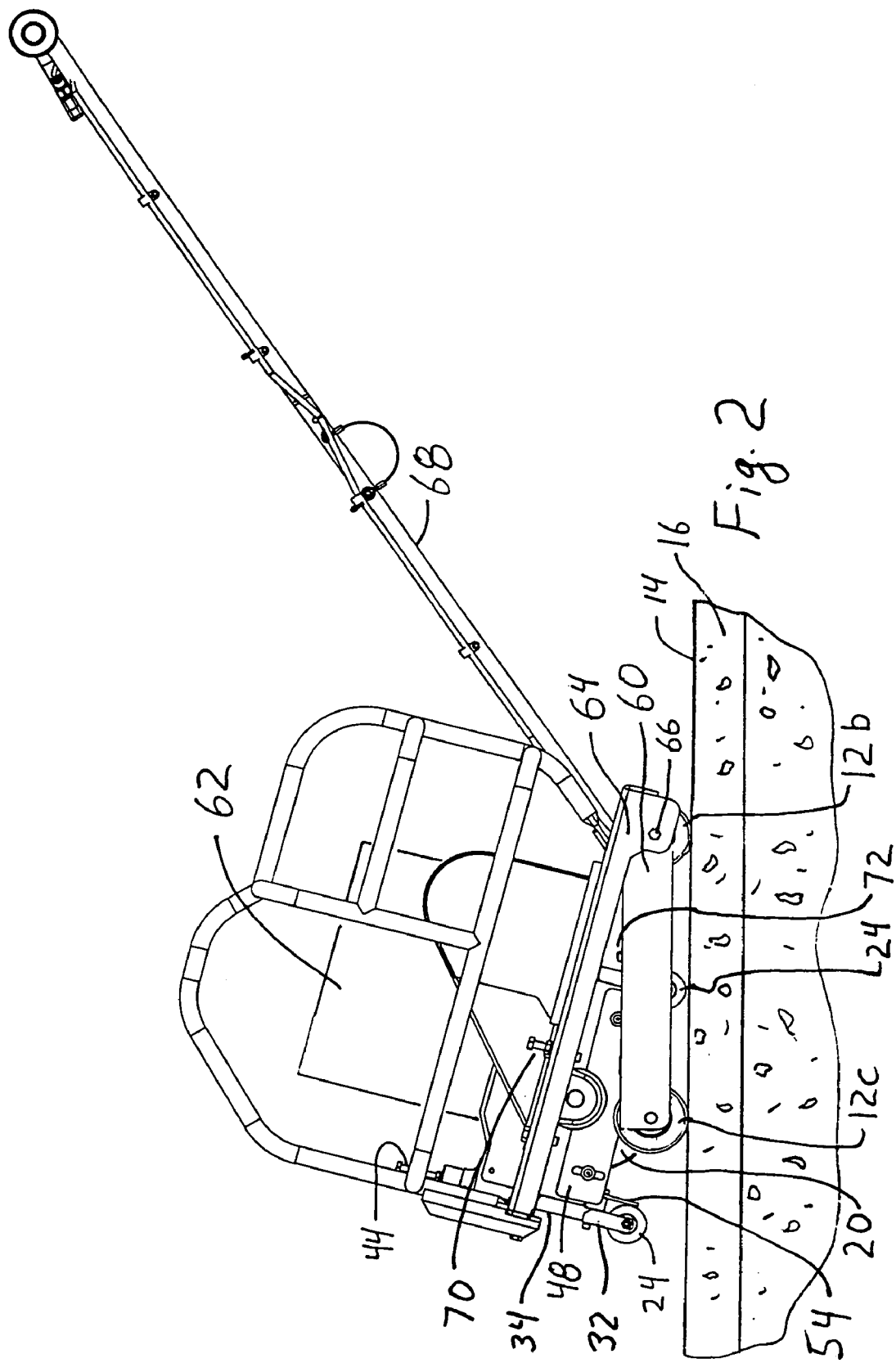
FIG. 2 is a side view of the saw of FIG. 1, from the opposing side.
Figure 3:
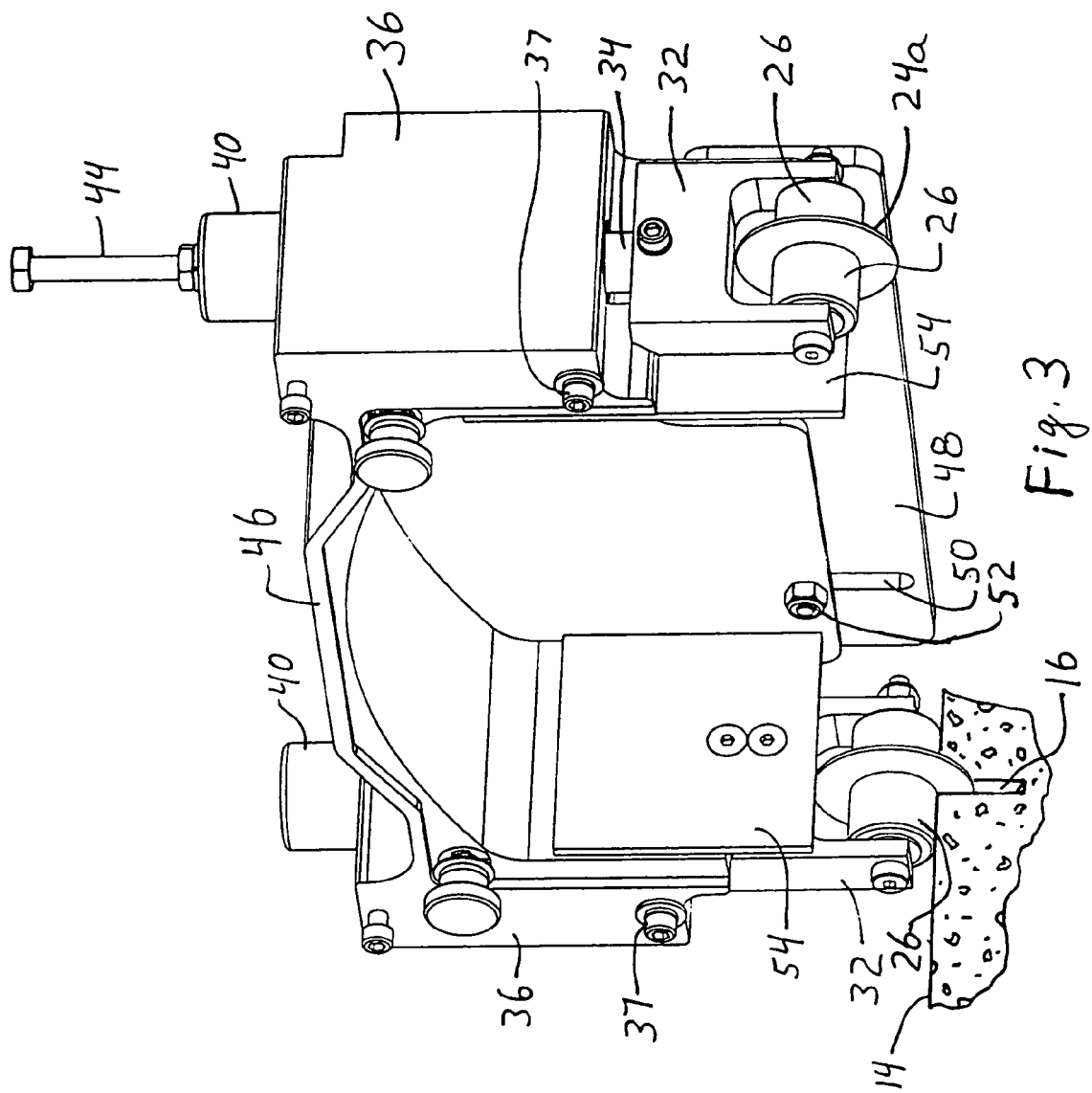
FIG. 3 is an upper perspective view of the blade guide assembly and blade housing of FIG. 2 with the cover of the blade housing removed.

Referring to FIGS. 1–2, the saw 10 has a two part base with the parts rotating relative to each other to pivot the blade 20 into and out of the concrete 14. A wheel carriage assembly 60 is formed by a frame which is fastened to a plurality of wheels 12 to roll over the concrete 14. Advantageously there are three wheels 12. Two of the wheels 12 are rear wheels 12a, 12b, located at the trailing end of the saw 10. The rear wheels 12a, 12b can be on a common axle and driven by motor 62 through a belt, chain, gears or other drive mechanisms. The third wheel 12 is a front wheel 12c, and is preferably in the same vertical plane as the drive shaft which rotates the cutting blade 20, during cutting.

A pivoting frame 64 is rotatably mounted to the wheel carriage assembly 60. The rotatable connection is achieved by placing a pivot axis 66 along the rear of the wheel carriage assembly 62, above the rear wheels 12a, 12b, and configuring the parts to pivot relative to each other. Extending a shaft through aligned bosses or bearings is suitable to form the pivoting connection. The motor 62, blade 20, blade housing 46 and guide blocks 36 are fastened to the pivoting frame 64. The pivoting frame 64 can be rotated relative to the wheel carriage assembly 60 to move the cutting blade 20 toward and away from the concrete 14. A handle 68 is fastened to the wheeled carriage assembly to guide and move the saw 10, and can be configured to rotate the pivoting frame 64 while doing so. The basic pivoting frame 64, wheel carriage assembly 60 and handle 68 are known in the art and thus not described in further detail herein.

During use, a person visually aligns the rear guide 24 with the groove 16 previously cut in the concrete 14. This alignment is done with the cutting blade pivoted away from the concrete 14 so the guides 24 and cutting blade are disengaged from the concrete. The springs 42 urge the guides 24 away from the guide block, and that helps visually align and place the rear guide 24 into the groove 16 by pivoting the blade 20 and guide 24 toward the concrete by rotation of the pivoting frame 64 relative to the wheeled carriage assembly 60.

As the guide 24 enters the groove 16, it cooperates with the walls forming the groove and/or the edges 18 to align the plane of the guide 24 with the groove. By using a tapered guide 24, it helps center the guide 24 in the groove 16 and better align the plane of the cutting blade with the groove. As the rear guide 24 is lowered into the groove 16, the rear support rollers 26 contact the surface 14 on opposing sides of the rear guide and that begins to move the rear shaft 34 into the housing, against the force of the rear spring 42.

The user next aligns the blade 20 and front guide 24 with the groove 16, and continues to lower them toward the concrete by rotating the pivoting frame relative to the wheel carriage assembly. Preferably, but optionally, the front guide 24 extends beyond the cutting blade 20 an amount sufficient that the front guide 24 enters the groove 16 before the cutting blade 20 begins cutting. If the cutting blade 20 has a pilot 22, the pilot preferably enters the groove after the front guide 26, but could enter the groove before the front guide does. The front and rear guides 26 cooperate with the walls forming the groove 16 and/or the exterior edges 18 to align the plane of the guides 24 with the plane extending through the cutting blade 20 and extending between the guides, so if the guide enter the groove 16 first, then the blade 20 is aligned and can make a good cut from the beginning.

Advantageously the blade 20, and guides 24 are in substantially the same plane during cutting, and that plane preferably extends down the middle of the groove 16. As a guide 24 on each end of the cutting blade 20 is aligned with the groove 16, the cutting blade is aligned with the groove. The rotation of the pivoting frame 64 is continued until the rotating cutting blade 20 is placed against the groove 16, preferably with the blade rotating so as to cut the exterior edges 18 to the desired contour as defined by the shape of the blade 20. The saw 10 is then pushed or power driven along the groove 16. The guides 24 help the blade 20 follow the groove 16 accurately.

The reference to the blade and guides being in the same plane is intended to encompass the slight rotation of the guides that preferably is permitted to occur as the blade 20 follows a slightly curved groove 16, recognizing that if the curve is too sharp or of too short a radius then the length of the blade extending into the groove will cause any pilot 22 (FIG. 9) segment to cut the walls forming the groove as the blade follows the groove, and may cause the blade 20 and pilot 22 to bind in the curved groove.

Figure 10:
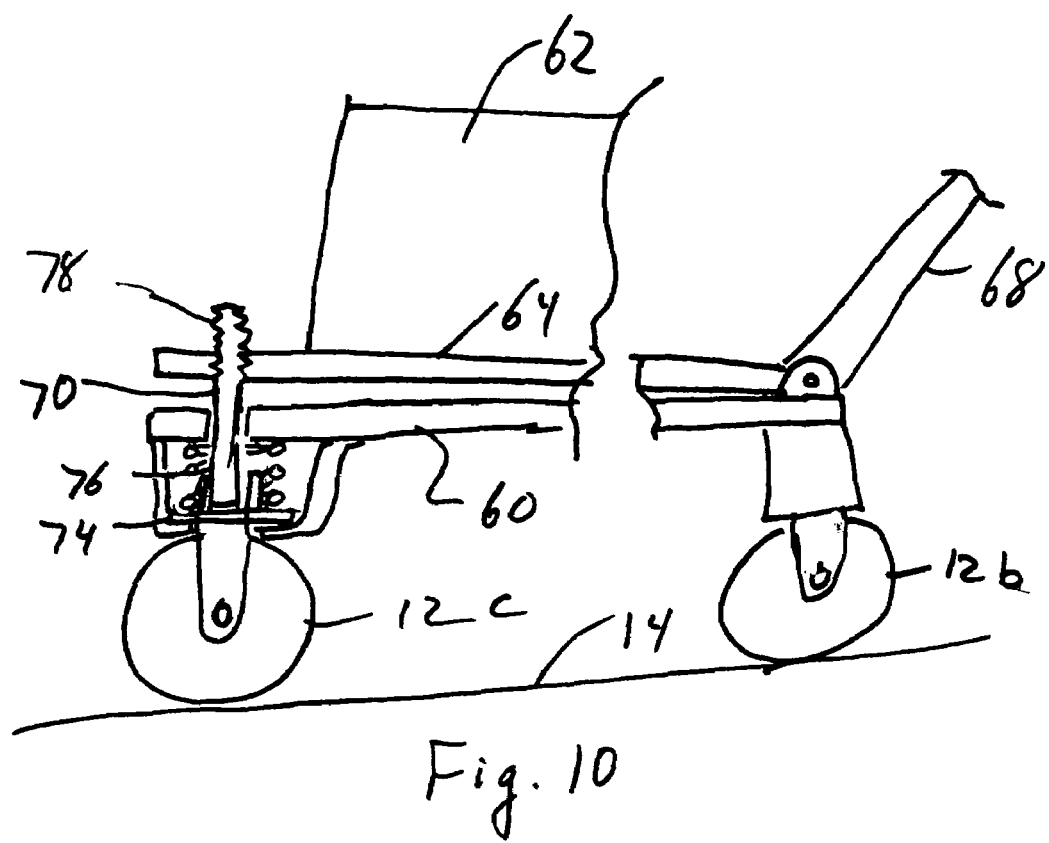
FIG. 10 is a partial side view of the saw of FIG. 1, but taken from the opposing side of the saw.

Referring to FIGS. 1–2 and 10, during positioning and alignment of the saw 10, the saw is supported on the concrete by the three wheels 12. During use, a portion of the weight of the saw 10 is carried by the leading support rollers 26 and the weight of the saw 10 is distributed to force the leading support rollers 26 into the plane defined by the wheels 12. To shift some of the saw weight toward the leading rollers 26 and to limit the depth of cut of the blade 20, a position stop 70 is placed on one of the pivoting frame 64 or the wheel carriage assembly, on the side opposite the blade 20. The stop 70 advantageously comprises an adjustable length member, such as a threaded fastener like a bolt or screw. FIG. 2 shows the stop 70 extending from the pivoting frame 64 toward the wheeled carriage assembly 60, but it could be the other way around. FIG. 10 shows the preferred embodiment with the stop 70 extending from the pivoting frame 64 to contact a mounting portion 74 connected to the front wheel 12*c*, with a spring 74 located to allow the wheel 12*c* to move resiliently between the wheel assembly 60 and the concrete 14.

The rear wheels 12*a*, 12*b* are on a common, preferably driven, axle. The front wheel 12*c* is advantageously resiliently supported on the wheel carriage assembly 60, as by spring 76 or other known arrangements, so the wheel 12*c* can move on the wheel carriage assembly 60 toward and away from the concrete surface 14. The adjustable stop 70 abuts mount 74 connected to the wheel 12*c* or the mount for the wheel to urge the wheel 12*c* toward the concrete 14. That allows the weight of the pivoting frame and motor to urge the front wheel 12*c* toward the concrete. The stop 70 could be on the wheel mounting of wheel 12*c* and extend toward the frame 64.

By limiting the distance between the wheel carriage assembly 60 and the pivoting frame 64 the depth of cut can be adjusted because the cutting blade is fastened to the pivoting frame and the stop 70 adjustably varies the distance which the pivoting frame moves toward the wheel carriage assembly and toward the concrete surface 14. Threads 78 on stop 70 are one of several ways to achieve that adjustment. By placing the stop 70 on the side opposite the cutting blade 20, the pivoting frame will twist slightly, and some of the weight carried by the pivoting frame 64 will be transferred to the leading support rollers 26 rather than through the stop 70 and into the wheel 12*c* and the wheel carriage assembly 60. By varying the length of the adjustable stop 70, the weight distribution of the pivoting frame 64 and parts mounted thereon (the motor 62, guide blocks 36, blade housing 46, blade 20 etc.) force the front rollers 24 against the concrete 14 adjacent the groove 16. The front roller supports 26 abut the concrete 14 to limit the movement of the blade 20 relative to the concrete 14, and to set the depth of the cut of blade 20.

The adjustment provided by screw 44 allows fine adjustment of the depth of cut by the blade 20 and ensures the support(s) 26 are in the plane defined by wheels 12. Because three points define a plane, and because the front movable support(s) 26 make a fourth point, the adjustment screw 44 is also used to ensure the front movable support(s) 26 lie in the plane defined by the wheels 12, while still providing a controlled depth of cut by blade 20.

When the saw 10 comes to the end of a slab with the groove 16 extending to the edge of the slab, then the leading guide 24 and support 26 move off the concrete surface 14. The weight of the saw 10 is then supported by the three wheels 12, or by a combination of the wheels 12 and the rear rolling supports 26. This change in weight distribution can cause the depth of cut to vary. The rear rolling supports 26 could be fitted with a motion stop such as screw 44 to help compensate for this. But preferably a second, edge limit stop 72 is placed on the wheel carriage assembly 60 and extends toward the pivoting frame 64 in order to limit the movement of the blade when the front rolling supports 26 roll off the edge of the concrete. The second, edge limit stop 72 is adjustable and could be constructed as the stop 70. The stop 72 could also be placed on the pivoting frame 64 and extend toward the wheel carriage assembly 60. Advantageously, but optionally, the edge stop 72 is placed on the same side of the saw as the cutting blade 20 as that is believed to provide a more definite and controlled depth adjustment for when the front support rollers roll off the concrete. In the depicted embodiment, the edge stop 72 does not limit relative motion between pivot frame 64 and wheel carriage assembly 60 unless the front movable support 24 looses contact with the concrete and the weight on the pivot frame 64 urges the blade toward the concrete 14.

There are preferably two guides 24, located on opposing leading and trailing edges of the blade 20. Each guide 24 advantageously, but optionally has at least one support member 26. The support members 26 could be omitted. The rear guide 24 may be used with no support rollers 26, or with a support roller on only one side of the groove 16, especially when the front support rollers 26 are used to control the depth of cut. It is possible, but less desirable, to put both guides 24 in front of or leading or trailing edge cutting blade 20. If front and back supports 26 are used, then it is desirable to keep the distance between the front and back rollers 26 and between the front and back guides 24 to a minimum. A larger distance restricts the ability to follow curved grooves or changes in the groove direction. Larger distances also reduce the sensitivity with which the front support rollers 26 vary the depth of cut.

While the illustrated embodiment uses front and rear guides 24, it is believed possible that a single guide 24 can be used, especially if the cutting blade 20 has a pilot 22.

Figure 9A:
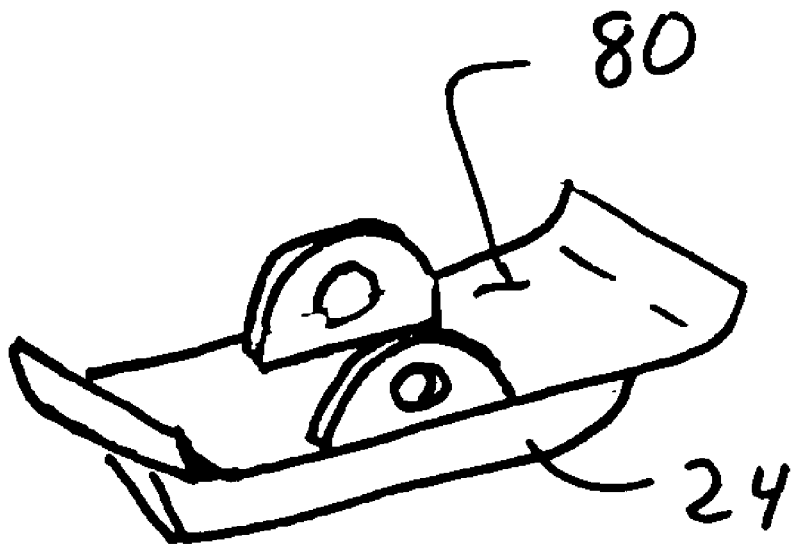
FIGS. 9a, 9b are top and bottom perspective views, respectively, of a sliding guide and support.
Figure 9B:
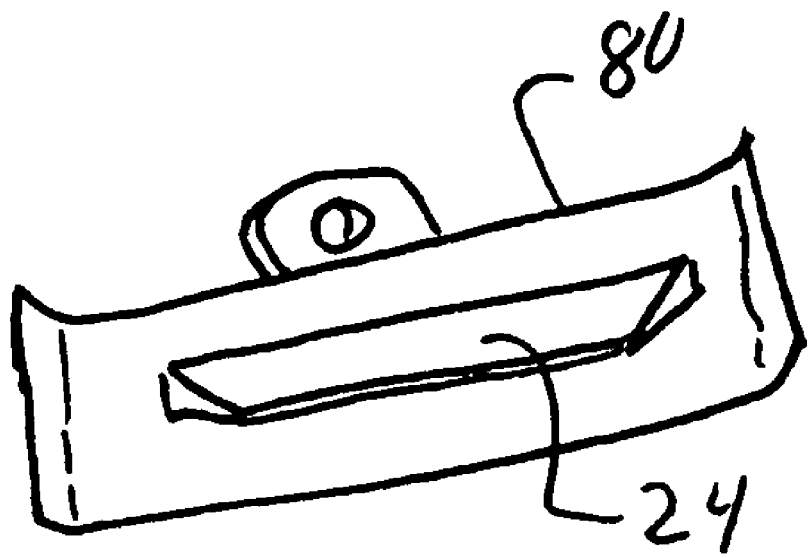

As mentioned above, the guide 24 need not be rotating. FIGS. 9a, 9b show a non-rotating guide 24 extending toward the concrete surface 14 from a sliding or skid portion 80. The skid 80 forms a plate with curved ends to avoid digging into the concrete, and with a boss, holes, bracket or other mechanism to fasten to the saw 10, and preferably to fasten to the yoke 32 and/or shaft 34. The leading and/or trailing edges of the non-rotating guide 24 are advantageously inclined or curved to reduce potential damage to the groove 16 and/or exterior edges 18. The guide 24 may be a uniform thickness, or tapered toward the distal end which is inserted the deepest into the groove 16. The sides of the guide 24 are not coated with abrasives so they slide along the groove 16 rather than cut the walls forming the groove.

The sliding guide 24 configured as shown in FIG. 9 could allow the use of only one guide with a blade 20 which has no pilot 22 (FIG. 8), provided the guide is made sufficiently long. A length of the guide 24 that is about the same as the diameter of cutting blade 20, or longer is believed to be a suitable length. Preferably, the length of the elongated guide 24 as shown in FIG. 9 is about the same as or greater than the length of the blade 20 extending into the slot 16 measured at and along the surface of the concrete 14. An elongated, sliding guide 20 is believed suitable because the specified length provides sufficient stability to ensure the blade 10 is in the plane of the groove 16. But a long guide member 24 can bind in the groove 16, especially if the groove is not straight, so preferably two shorter guides 24 are used as described herein.

Whether rotating or non-rotating, the guide(s) 24 are advantageously configured so they do not cut or form either the groove 16 or the walls forming the groove, or the exterior edges of the groove. Instead the guide(s) 24 move within the slot and contact the walls forming the slot or the exterior edges of the slot only enough to guide the blade 20 advantageously, with minimal change to the walls defining the groove 16 and to the exterior edges 18. The edges 18 of groove 16 could be used to direct the guide 24. But advantageously the guide 24 is guided by the walls of the slot 16 so that potential damage to the exterior edge or edges 18 are avoided, either before cutting or after cutting by blade 20. However, because the exterior edges 18 are being formed or cut by cutting blade 20, it is possible that when the guide 24 is placed in front of the blade, the guide or guides can contact and alter the edges 18 as any change in the edge will be removed or cut by the blade 20.

In further variations on this invention, while the blade 20 is described as up-cutting, it could be a down-cutting blade although the down-cut will urge debris into the groove 16 rather than out of the groove as with an up-cutting blade. Further, it is believed possible to have the guide(s) 24 contact the bottom of the groove 16, but if so then the support(s) 26 could not be connected to the guide in contact with the bottom of the groove, or any connected support could not be used to adjust the depth of cut by blade 20 as described above.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of forming the movable supports 26, including the use of skid plates or continuous loop tracks extending over two or more lugged wheels. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A concrete saw for use with a rotating cutting blade that rotates in a first plane to cut a groove in a concrete surface, comprising:
    a first guide sized to fit in the groove and located in front of the cutting blade and positionable in the first plane, the first guide extending a distance sufficient to extend beyond the surface of the concrete cut by the saw during use of the saw; and
    a second guide sized to fit in the groove and located behind the cutting blade and positionable in the first plane, the first guide extending a distance sufficient to extend beyond the surface of the concrete cut by the saw during use of the saw.

2. The concrete saw of claim 1, wherein at least one guide comprises a sliding plate with the guide depending from the plate.

3. The concrete saw of claim 1, wherein guide comprises a rotating disk.

4. The concrete saw of claim 3, wherein the at least one rotating disk has a distal edge with the disk tapered toward that distal edge.

5. The concrete saw of claim 1, wherein at least one guide comprises a rotating disk having a diameter selected so that while it extends beyond the surface of the concrete it does not extend a distance sufficient to contact a bottom of a groove previously cut in the concrete surface.

6. The concrete saw of claim 1, wherein at least one guide comprises a rotating disk having a rolling support on at least one side of the disk with the rolling support sized so it contacts the concrete surface during use of the saw to cut the concrete.

7. The concrete saw of claim 1, wherein at least one guide comprises a rotating disk having a rolling support on opposing sides of the disk with the rolling supports each sized to contact the concrete surface during use of the saw to cut concrete.

8. The concrete saw of claim 1, wherein each guide comprises a rotating disk having a rolling support on opposing sides of the disk with the rolling supports each sized to contact the concrete surface during use of the saw to cut the concrete.

9. The concrete saw of claim 1, wherein at least one of the guides rotates about an axis substantially perpendicular to the concrete surface during cutting.

10. The concrete saw of claim 1, wherein at least one of the guides rotates about an axis parallel to the rotational axis of the blade and also rotates about an axis substantially perpendicular to the concrete surface during cutting.

11. The concrete saw of claim 1, wherein each of the guides rotates about an axis parallel to the rotational axis of the blade and also rotates about an axis substantially perpendicular to the concrete surface during cutting.

12. The concrete saw of claim 1, wherein the blade rotates in an up-cut rotation exiting the concrete adjacent the first guide, and further comprising a diverter interposed between the blade and first guide to shield the first guide from debris from the blade.

13. The concrete saw of claim 1, wherein the blade rotates in an up-cut rotation exiting the concrete adjacent the first guide, and further comprising a first support adjacent the first guide, the support extending from the saw a distance to abut the concrete adjacent the first guide during use of the saw, and a diverter interposed between the blade and first guide to shield the first support from debris from the blade.

14. The concrete saw of claim 7, wherein a spring resiliently urges at least one of the supports toward the concrete surface during use of the saw.

15. The concrete saw of claim 7, wherein a spring resiliently urges the support adjacent the second guide toward the concrete surface during use of the saw, and wherein the support adjacent the first guide is mounted to a shaft confined to move toward and away from the concrete along an axis substantially perpendicular to the concrete, with a stop located to limit the movement of that support during use of the saw.

16. A concrete cutting saw for use with a rotating cutting blade that rotates in a first plane, the cutting blade being mounted to a pivoting frame which is mounted to and pivots relative to a wheeled carriage frame, the cutting blade being configured to form the edges of a groove previously cut in a concrete surface to a first depth of the groove, the groove having a second depth, comprising:
first guide means for guiding the cutting blade along the groove, the first guide means extending into the groove a distance less than the second depth; and
second guide means for guiding the cutting blade along the groove, the second guide means extending into the groove a distance less than the second depth.

17. The concrete cutting saw of claim 16, wherein at least one of the first and second guide means rotates about an axis parallel to the concrete surface during cutting.

18. The concrete cutting saw of claim 16, further comprising first movable support means for supporting the first guide means on the concrete surface during cutting.

19. A concrete saw for shaping one or more exterior edges of a groove in a concrete surface to a first depth, the groove being cut in the concrete to a second depth which is greater than the first depth, comprising:
a rotating cutting blade having at least one cutting surface configured to shape at least one of the edges during use of the saw;
a first movable support connected to the saw and located to abut the concrete surface adjacent the groove and sufficiently close to the cutting blade that debris from the shaping of the at least one edge would be thrown by the blade so as to get between the movable support and the concrete;
a first guide connected to the saw and extending into the groove adjacent the first support a distance less than the second depth, the first guide being in the same plane as the cutting blade during use of the saw;
a first diverter connected to the saw and located so the diverter is interposed between the cutting blade and the first movable support member, the diverter being large enough and located close enough to the concrete to block debris from the blade from getting between the first movable support and the concrete.

20. The concrete saw of claim 19, wherein the blade is an up-cutting blade and the first guide and first diverter are located on the leading end of the saw.

21. The concrete saw of claim 19, further comprising a pilot on the cutting blade, the pilot having no abrasives on the sides of the pilot.

22. The concrete saw of claim 19, further comprising:
a second guide connected to the saw and extending into the groove during use of the saw.

23. The concrete saw of claim 22, further comprising a second movable support member located adjacent the second guide and abutting the concrete surface adjacent the groove during use of the saw.

24. The concrete saw of claim 22, wherein the second guide is on the opposing side of the blade as the first guide during cutting.

25. The concrete saw of claim 22, wherein the second guide is on the same side of the blade as the first guide during cutting.

26. The concrete saw of claim 22, wherein the first and second guides are on the leading side of the blade during cutting.

27. The concrete saw of claim 24, further comprising a movable support member located adjacent the second guide and abutting the concrete surface adjacent the groove during use of the saw.

28. The concrete saw of claim 19, wherein the first guide comprises a rotating disc.

29. The concrete saw of claim 26, wherein the first guide comprises a rotating disc.

30. The concrete saw of claim 19, wherein the first guide is located on the leading side of the cutting blade, the first guide and the rotating cutting blade being connected to a common frame, the first movable support being mounted to the frame and adjustably positionable relative to the frame to vary the distance between the frame and the concrete surface.

31. A method of shaping one or more exterior edges of a groove cut in a concrete surface using a saw with a rotating cutting blade having a contour selected to provide a desired shape on at least one exterior edge, comprising:
placing a first guide in the groove, the first guide being connected to the saw;
placing a second guide in the groove, the second guide being connected to the saw, the first and second guides aligning the rotating blade with the groove;
using the first and second guides in the slot to guide the saw along the groove; and
rotating the cutting blade to shape the one or more exterior edges as the saw is guided along the groove.

32. The method of claim 31, further comprising placing the first and second guides on opposing leading and trailing edges of the cutting blade during shaping of the one or more edges of the groove.

33. The method of claim 31, further comprising placing the first and second guides on the same leading or trailing edge of the cutting blade during shaping of the one or more edges of the groove.

34. The method of claim 31, further comprising supporting the saw on the concrete adjacent to the first guide.

35. The method of claim 34, wherein the supporting step uses at least one moving support.

36. The method of claim 34, wherein the supporting step uses two rolling surfaces, one on each side of the first guide.

37. The method of claim 35, further comprising diverting debris from the cutting blade adjacent the location where the cutting blade exits the groove so as to prevent the debris from passing between concrete and the moving support.

38. The method of claim 31, further comprising rotating at least one guide about an axis perpendicular to the concrete surface in which the groove is located.

39. The method of claim 31, further comprising adjusting the depth of cut of the cutting blade by adjusting the position of the movable support relative to the saw.

* * * * *